United States Patent
Shinde et al.

(10) Patent No.: US 10,248,797 B1
(45) Date of Patent: Apr. 2, 2019

(54) SYSTEMS AND METHODS FOR ZERO-DAY DLP PROTECTION HAVING ENHANCED FILE UPLOAD PROCESSING

(71) Applicant: Symantec Corporation, Mountain View, CA (US)

(72) Inventors: Ameet Shinde, Mountain View, CA (US); Eftiquar Shaikh, Mountain View, CA (US); Rupesh Khetawat, Mountain View, CA (US); Jogesh Sharma, Mountain View, CA (US); Amit Dhotre, Mountain View, CA (US)

(73) Assignee: SYMANTEC CORPORATION, Mountain View, CA (US)

( * ) Notice: Subject to any disclaimer, the term of this patent is extended or adjusted under 35 U.S.C. 154(b) by 400 days.

(21) Appl. No.: 15/199,700

(22) Filed: Jun. 30, 2016

(51) Int. Cl.
| | |
|---|---|
| *G06F 21/60* | (2013.01) |
| *G06F 16/172* | (2019.01) |
| *H04L 29/06* | (2006.01) |
| *H04L 29/08* | (2006.01) |
| *H04L 12/26* | (2006.01) |

(52) U.S. Cl.
CPC ......... *G06F 21/604* (2013.01); *G06F 16/172* (2019.01); *H04L 43/106* (2013.01); *H04L 63/0428* (2013.01); *H04L 67/02* (2013.01); *H04L 67/06* (2013.01); *H04L 67/2842* (2013.01)

(58) Field of Classification Search
CPC .. G06F 21/604; G06F 17/30132; G06F 21/60; G06F 16/172; H04L 43/106; H04L 63/0428; H04L 67/02; H04L 67/06; H04L 67/2842; H04L 29/06; H04L 12/26; H04L 29/08
See application file for complete search history.

(56) References Cited

U.S. PATENT DOCUMENTS

| | | | | |
|---|---|---|---|---|
| 7,277,896 | B2* | 10/2007 | Matsubara | H04L 67/104 707/827 |
| 8,010,629 | B2* | 8/2011 | Lanahan | G06T 11/60 709/218 |
| 8,959,434 | B2* | 2/2015 | Fujita | G06F 3/0486 715/205 |

(Continued)

*Primary Examiner* — Jayesh M Jhaveri
(74) *Attorney, Agent, or Firm* — Maschoff Brennan

(57) ABSTRACT

Systems and methods for Zero-day Data Loss Protection (DLP) having enhanced file upload processing are provided. One method may include capturing and sending file upload context (e.g. folder name, metadata, an active URL, etc.) associated with the scheduled file or folder upload to a DLP filesystem driver. For example, the method may include detecting whether a single/multi-file upload, a folder upload, or a drag-and-drop operation exists, through interception of the shell dialog API, the browse folder API, or the drop process interface, respectively. Further, the method may include generating a file upload cache including the file upload context, prior classification entries, and a timestamp indicating when the scheduled file or folder upload was last modified; such that, the DLP filesystem driver may intercept and process the file open call based upon the file upload cache. Accordingly, the file may be processed in accordance with a prior file classification, file/domain filter, or DLP policy.

16 Claims, 6 Drawing Sheets

(56) References Cited

U.S. PATENT DOCUMENTS

| | | | |
|---|---|---|---|
| 2006/0129627 A1* | 6/2006 | Phillips | H04L 63/10 709/200 |
| 2009/0037519 A1* | 2/2009 | Young | G06F 17/30902 709/203 |
| 2012/0047365 A1* | 2/2012 | Mercer | G06F 21/606 713/168 |
| 2012/0089706 A1* | 4/2012 | Collins | H04N 1/00244 709/219 |
| 2013/0212432 A1* | 8/2013 | Guthrie | G06F 11/0709 714/16 |
| 2015/0134600 A1* | 5/2015 | Eisner | H04L 51/04 707/608 |
| 2015/0278168 A1* | 10/2015 | Hawa | G06F 17/30581 715/205 |
| 2017/0093820 A1* | 3/2017 | Forguson | H04L 9/0822 |
| 2017/0099344 A1* | 4/2017 | Hadfield | H04L 67/02 |

* cited by examiner

SYSTEMS AND METHODS FOR ZERO-DAY DLP PROTECTION HAVING ENHANCED FILE UPLOAD PROCESSING

BACKGROUND

Data Loss Prevention (DLP) systems are designed to detect and prevent unauthorized use and transmission of confidential information. Modern organizations typically maintain a data storage system to store and deliver sensitive information concerning various significant business aspects of the organization. Sensitive information may include data on customers (or patients), contracts, deliveries, supplies, employees, manufacturing, or the like. In addition, sensitive information may include intellectual property (IP) of an organization such as software code developed by employees of the organization, documents describing inventions conceived by employees of the organization, and the like. Such data may be in the form of files, messages, web requests or the like. The DLP system may be implemented within a computing system or network to provide computer and information security by identifying, monitoring, and protecting data, while the data is in use (i.e. endpoint actions), in motion (i.e. network actions), and at rest (i.e. data storage). These DLP technologies apply configurable rules to identify objects, such as files, that contain sensitive data and should not be found outside of a particular enterprise or specific set of host computers or storage devices.

In an effort to monitor data upload traffic through a browser, most DLP systems focus primarily upon screening each file upload. However, focusing upon file accesses that correspond to upload activity without causing prohibitive delays remains a challenging task. Existing solutions rely on non-Hypertext Transfer Protocol Secure (HTTPS)-based traffic monitoring through network driver and HTTPS-based traffic monitoring using plugins or hooks into the browser. In the alternative, the HTTPS-based traffic monitoring may utilize Application File Access Control (AFAC). However, problems arise for these solutions due to a lack of standardization in specifying file names destined for uploads. In particular, these systems intercept HTTPS traffic prior to SSL encryption and then parse the headers for "well-known" attributes that encode file names. Yet, due to the lack of standardization, a risk exists for losing sensitive data when these well-known attributes are not used to specify the scheduled file or folder upload name. To further complicate matters, developers of web applications tend to deviate from standard protocols. Therefore, it is becoming difficult to keep pace with software versions implementing changes in web applications. The problem becomes even worse with frequent releases of browsers, as web applications exhibit different behaviors with each changed browser version. It is within this context that the embodiments arise.

SUMMARY

Embodiments of systems and methods for zero-day DLP protection are provided. In particular, the system and method provide zero-day DLP protection for file uploads through an internet browser or Instant Messaging (IM) using point based detection. It should be appreciated that the present embodiment can be implemented in numerous ways, such as a process, an apparatus, a system, a device, or a method. Several inventive embodiments are described below.

In some embodiments, a system and method for zero-day DLP having enhanced file upload processing is provided. The method may include capturing and sending file upload context (e.g. folder name, metadata, an active URL, etc.) associated with the scheduled file or folder upload to a DLP file system driver. For example, in an effort to capture the file upload context, the method may include detecting whether a single upload, a multi-file upload, a folder upload, or a drag-and-drop operation exists, through interception of the shell dialogue API, the browse folder API, or the drop process interface, respectively. Further, the method may include generating a file upload cache including the file upload context, prior classification entries, and a timestamp indicating when the scheduled file or folder upload was last modified; such that, the DLP file system driver may intercept and process the file open call based upon the file upload cache. In some embodiments, the file system driver may detect a match between the file path of the scheduled file or folder upload and a current process, a parent process, or a process that initiates a current X interProcess Communication (XPC) service. In response to the detected file path match, the driver may detect whether the active URL is closed or the browser process is terminated. When the URL is closed or the process is terminated, the method may include invalidating the file upload cache. In the alternative, the process may include detecting a match between the scheduled file or folder upload and a prior file classification entry, such that when a prior classification exists, the system processes the scheduled file or folder upload based upon the prior classification. In some embodiments, for further verification that the file classification has not changed to a differing one, the system may detect whether the prior modification timestamp of the scheduled file or folder upload corresponds with the prior classification. In the alternative, when no prior classification exists, the method may include determining a file classification for the scheduled file or folder upload by assessing whether the file corresponds with a file in a file/domain filter, or the file violates a DLP policy, where the file contains sensitive for restricted data. Thereby, the file is processed in accordance with either a prior file classification, a file/domain filter, or a DLP policy.

In some embodiments, a DLP system having enhanced file upload processing is provided. The DLP system may include a processor coupled to memory to execute a DLP agent; wherein, the processor is operable to capture file upload context (e.g. folder name, metadata, an active URL, etc.) in real-time for an scheduled file or folder upload and send the file upload context to a DLP filesystem driver within the DLP agent. The processor may also be operable to detect whether a single upload, a multi-file upload, a folder upload, or a drag-and-drop operation exists, through interception of the shell dialogue API, the browse folder API, or the drop process interface, respectively. Further, the processor may also be operable to generate a file upload cache including the file upload context, prior classification entries, and a timestamp indicating when the scheduled file or folder upload was last modified; such that, the DLP file system driver may be operable to intercept and process the file open call based upon the file upload cache. For example, the file system driver may be operable to detect a match between the file path of the scheduled file or folder upload and a current process, a parent process, or a process that initiates a current XPC service. In response to the detected file path match, the driver may be operable to detect whether the active URL is closed or the browser process is terminated. When the URL is closed or the process is terminated, the driver may be operable to invalidate the file upload cache. In the alternative, the processor or driver may be operable to detect a match between the scheduled file or folder upload and a prior file classification entry, such that when a prior classification exists, the system processes the scheduled file or folder upload based upon the prior classification. For further verification that the file classification has not changed to a differing one, the driver may be operable to detect whether the prior modification timestamp of the scheduled file or folder upload corresponds with the prior classification. In the alternative, when no prior classification exists, the driver may be operable to determine a file classification for the scheduled file or folder upload by assessing whether the file corresponds with a file in a file/domain filter, or the file violates a DLP policy. Thereby, the file may be processed in accordance with either a prior file classification, a file/domain filter, or a DLP policy.

In some embodiments, a tangible, non-transitory, computer-readable media having instructions whereupon which, when executed by a processor, cause the processor to perform the zero-day DLP protection method described herein. The method may include capturing and sending file upload context (e.g. folder name, metadata, an active URL, etc.) associated with the scheduled file or folder upload to a DLP file system driver. For example, in an effort to capture the file upload context, the method may include detecting whether a single upload, a multi-file upload, a folder upload, or a drag-and-drop operation exists, through interception of the shell dialogue API, the browse folder API, or the drop process interface, respectively. Further, the method may include generating a file upload cache including the file upload context, prior classification entries, and a timestamp indicating when the scheduled file or folder upload was last modified; such that, the DLP file system driver may intercept and process the file open call based upon the file upload cache. In some embodiments, the file system driver may detect a match between the file path of the scheduled file or folder upload and a current process, a parent process, or a process that initiates a current XPC service. In response to the detected file path match, the driver may detect whether the active URL is closed or the browser process is terminated. When the URL is closed or the process is terminated, the method may include invalidating the file upload cache. In the alternative, the process may include detecting a match between the scheduled file or folder upload and a prior file classification entry, such that when a prior classification exists, the system processes the scheduled file or folder upload based upon the prior classification. In some embodiments, for further verification that the file classification has not changed to a differing one, the system may detect whether the prior modification timestamp of the scheduled file or folder upload corresponds with the prior classification. In the alternative, when no prior classification exists, the method may include determining a file classification for the scheduled file or folder upload by assessing whether the file corresponds with a file in a file/domain filter, or the file violates a DLP policy, where the file contains sensitive for restricted data. Thereby, the file is processed in accordance with either a prior file classification, a file/domain filter, or a DLP policy.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one so skilled in the art without departing from the spirit and scope of the described embodiments.

DETAILED DESCRIPTION

Figure 1:
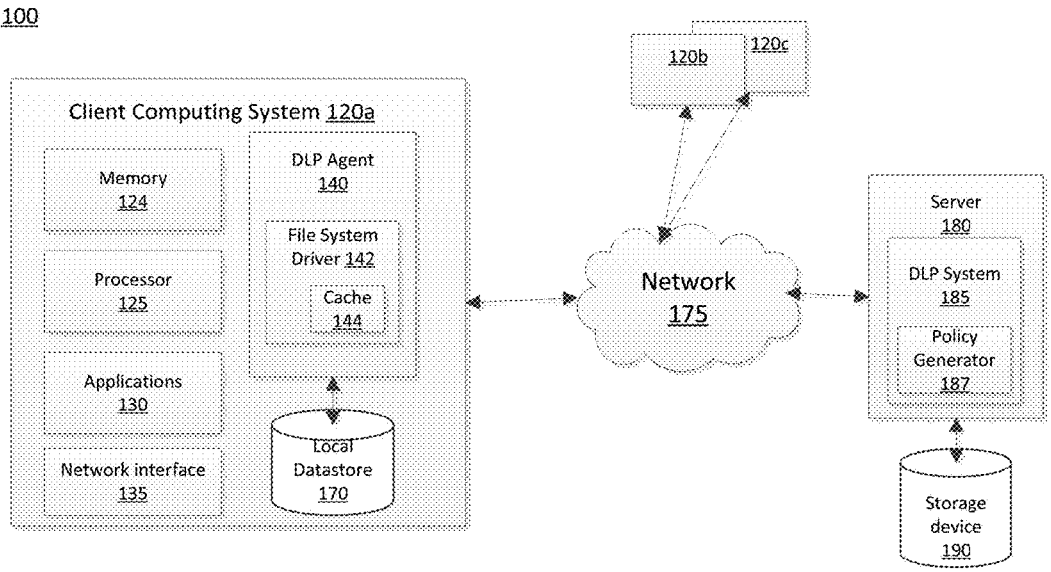
FIG. 1 is a system diagram of a DLP system having enhanced file upload processing, in accordance with some embodiments.

The following embodiments describe systems and methods for zero day DLP protection having enhanced file upload processing. It can be appreciated by one skilled in the art, that the embodiments may be practiced without some or all of these specific details. In other instances, well known process operations have not been described in detail in order not to unnecessarily obscure the embodiments.

The system may include a DLP agent having a processor that is operable to capture and send file upload context associated with the scheduled file or folder upload in real time to a DLP filesystem driver. The file upload context may include the folder name, metadata, active URL, and the like. Shell dialogues may comprise two types of file transfers: a file upload or a folder upload. In some embodiments, a file upload is intercepted while choosing the file. The folder upload uploads can be more complex. Detection of a file upload occurs when the file choose dialogue is dismissed. After performing detection of the file upload, the file is filtered using known files that have been blocked. Accordingly, the application never detects a forbidden file. For a folder upload, detection may begin when a process starts accessing the files under the associated folder. The folder may be chosen using a shell dialogue, where it is associated with a URL of a currently opened tab on a browser. Subsequently, file open calls can be monitored to match the file path with the folder path associated with the schedule folder upload. When a match is found, the file and the corresponding URL are associated one with another.

In one embodiment, in an effort to capture the file upload context, the DLP agent may detect whether a single upload, a multi-file upload, a folder upload, or a drag-and-drop operation exists, through interception of the shell dialogue API, the browse folder API, or the drop process interface, respectively. Further, the DLP filesystem driver may generate a file upload cache including the file upload context, prior classification entries, and a timestamp indicating when the scheduled file or folder upload was last modified; such that, the driver may intercept and process the file open call based upon the file upload cache.

In some embodiments, the file system driver may detect a match between the file path of the scheduled file or folder upload and a current process, a parent process, or a process that initiates a current XPC service. In response to the detected file path match, the driver may detect whether the active URL is closed or the browser process is terminated. When the URL is closed or the process is terminated, the driver may invalidate the file upload cache and determine the file classification anew. Further, the driver may detect a match between the scheduled file or folder upload and a prior file classification entry, such that when a prior classification exists, the system processes the scheduled file or folder upload based upon this prior classification. For further verification that the file classification has not changed to a differing one, the driver may detect whether the prior modification timestamp of the scheduled file or folder upload corresponds with the prior classification. In the alternative, when no prior classification exists, the driver may determine a file classification for the scheduled file or folder upload anew, where the driver assesses whether the file corresponds with a file in a file/domain filter, or the file, violates a DLP policy. Thereby, the scheduled file or folder upload may be processed in accordance with either a prior file classification, a file/domain filter, or a DLP policy.

These proposed systems and methods uniquely identify the file and folder being uploaded using various methods, including intercepting the shell dialog API, the browser folder API, and the drag and drop process interface. Further, these methods may include monitoring file and folder uploads using associated child processes, sandboxed application file uploads characteristics, and context association. An advantage of these systems is that DLP may be implemented for file uploads in a protocol independent way. The proposed methods support various versions of browsers and other upload techniques. Further, these systems and methods provide easy remediation when coordinating the file upload context with the content necessary for remediation. In some embodiments, web applications may use a sandboxed mechanism to do the actual upload. While sandboxing applications and coordinating file uploads may create a challenge for conventional DLP systems, the systems and methods described herein handle these types of uploads with ease. There are a number of system configurations that are compatible with the DLP systems and methods described herein. In particular, systems that include monitoring file/folder for uploads through a shell dialogue, a drag/drop operation, or a child process, may take advantage of the DLP method having enhanced upload processing described herein.

In operation, when a user initiates file transfer, the DLP filesystem driver may intercept the shell APIs, which are invoked when the file transfer is initiated. Ordinarily, any file being uploaded through the browser is funneled through the common file picker dialog or drag and drop operation. Accordingly, well-known interfaces associated with the file picker dialog and drag-and-drop operation can be intercepted in an effort to unambiguously identify the particular file being transferred. When browsers surreptitiously (secretly) upload a file, most systems may be severely compromised, wherein processing this type of activity does not ordinarily fall within the domain of DLP solutions. Even in light of a browser secretly uploading a file, however, the systems and methods disclosed herein are able to detect the file transfer in progress during the transfer in accordance with predetermined DLP security policies. The URL active at the time of the file transfer operation can be obtained, which helps to define the "context" of the file transfer; wherein, appropriate site filtering can be applied. Since file picker dialogs are modal and drag-and-drop operations rarely are concurrent, no ambiguity exists regarding the active URL, when either of these operations occurs.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "providing," "generating," "installing," "monitoring," "enforcing," "receiving," "logging," "intercepting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Referring to FIG. 1, system diagram of a DLP system having enhanced file upload processing, in accordance with some embodiments is shown. The system includes at least one client node 120a-c, a network 175, at least one DLP server 180, and a database 190. Computing devices nodes 120a-c, with local data store 170, are coupled by a network 175 to the DLP server 180 having its own DLP system module 185 and policy generator 187. The server 180 may couple to the storage device 190 for reference to prior file classification results and versions of other parameters described below. Each client node 120a-c may include a DLP agent 140, memory 124, a processor 125, and local data store 170. The client nodes 120a-c may further include applications 130, and a network interface 135 that can be monitored by the DLP agent 140 as would be appreciated by one of ordinary skill in the art having the benefit of this disclosure. Applications 130 may be comprised of operating systems, database applications, e-mail applications, and virtual machines, productivity applications, browser applications, and the like.

In some embodiments, the DLP agent 140 may serve as a device that communicates with the server 180 to perform the method of DLP having enhanced file uploading capabilities described more in detail below. In other embodiments, the DLP system 185 having a policy generator may communicate with each client node 120*a-c* and serve as the sole agent that performs the method of DLP described herein. The client nodes 120*a-c*, server 180, and the storage device 190 may reside on the same LAN, or on different LANs that may be coupled together through the Internet, but separated by firewalls, routers, and/or other network devices. In one embodiment, client nodes 120*a-c* may couple to network 175 through a mobile communication network. In another embodiment, the client nodes 120*a-c*, server 180, and the storage device 190 may reside on different networks. In some embodiments, the DLP server 180 may reside in a cloud network. Although not shown, in various embodiments, the client node 120*a-c* may be notebook computers, desktop computers, microprocessor-based or programmable consumer electronics, network appliances, mobile telephones, smart telephones, pagers, radio frequency (RF) devices, infrared (IR) devices, Personal Digital Assistants (PDAs), set-top boxes, cameras, integrated devices combining at least two of the preceding devices, and the like.

The DLP server 180 may comprise a processor (not shown), memory (not shown), and DLP system 185 having a policy generator 187. In some embodiments, the DLP system 185 may comprise processing software instructions and/or hardware logic required for DLP having enhanced file upload according to the embodiments described herein. The DLP server 180 may provide remote cloud storage capabilities for file classifications, file filters, domain filters, and various types of DLP policies associated, through the storage device 190 coupled by network 175. Further, these may couple to one or more tape-out devices (not shown) or any other secondary datastore. As such, a database of DLP policies may be stored within a local data store, remote disks, secondary data storage devices, or tape-outs devices (not shown). The database may include prior classification entries associated with the scheduled file or folder uploads, file/domain filters, prior file upload context data, timestamps, and the like. In some embodiments, the client node 120*a* may retrieve previous results relating to an scheduled file or folder upload initially from a remote datastore to a local data store 170. In other embodiments, the database of DLP policies, prior detection results, file upload context data, and the like may be stored locally on the client node 120*a-c* or the server 180. In particular, for remote storage purposes, the local data storage unit 190 can be one or more centralized data repositories having mappings of respective associations between each fragment data and its location within remote storage devices. The local data store may represent a single or multiple data structures (databases, repositories, files, etc.) residing on one or more mass storage devices, such as magnetic or optical storage based disks, tapes or hard drives. This local data store may be an internal component of the server 180. In the alternative, the local data store 19 also may couple externally to server 180 as shown in FIG. 1, or remotely through a network. Further, the DLP server 180 may communicate with the remote storage devices over a public or private network. Although not shown, in various embodiments, the DLP server 180 may be a notebook computer, desktop computer, microprocessor-based or programmable consumer electronics, network appliance, mobile telephone, smart telephone, radio frequency (RF) device, infrared (IR) device, Personal Digital Assistant (PDA), set-top box, an integrated device combining at least two of the preceding devices, and the like.

In operation, DLP agent 140 may monitor when the file is scheduled to be uploaded through a browser application and capture in real-time the file upload context associated with the scheduled file or folder upload. The captured file upload context may include the file name, folder name, metadata, active URL, and the like. Metadata associated with the file or folder may include the processor identification (PID), active user, and the like. Consequently, the DLP agent 140 may send the file upload context to the DLP filesystem driver 142 for processing based upon the file upload context. In an effort to detect an associated operation corresponding to the scheduled file or folder upload, the DLP agent 140 may intercept the shell dialogue API, the browse folder API, or the drop process interface, to determine whether a single/multi-file upload, a folder upload, or a drag and drop operation is associated with the file scheduled to be uploaded. For example, when intercepting the shell dialogue API, the commands, GetOpenFileName (Windows) and NSOpenPanel (Mac), may be used. Further, when intercepting the browse folder API, the command, ShBrowseForFolder (Windows), may be used. Additionally, when intercepting the drop process (method) interface, the IDropTargetHelper interface, which is exposed by the web browser during the browser's instance creation, may be accessed through hooking CoCreateInstance. Focusing upon the drop process (method) eliminates false detection when a file or folder is dragged over the browser window, yet not dropped. The folder name which is being dropped may be cached in a global structure. Thereby, a detected match between the file/folder scheduled for upload and data parsed from either the shell dialogue API, the browse folder API, or the drop process interface can indicate the associated operation for the scheduled file or folder upload. Once the context information is received by the DLP filesystem driver 142, the driver 142 may generate a file upload cache including the file upload context, prior classification entries, and a timestamp indicating when the scheduled file or folder upload was last modified; such that, the driver 142 may intercept and process the file open call based upon the file upload cache. The file upload context may be used to match the file path and the active URL helps to associate the web application with the file upload for remediation purposes. The prior classification entries (detection results) in conjunction with the PID help to avoid false positives.

In some embodiments, the file system driver 142 initiates the processing of the file open call by detecting a match between the file path of the scheduled file or folder upload and a current process, a parent process, or a process that initiates a current XPC service. In response to the detected filepath match, the driver 142 may detect whether the active URL is closed or the browser process is terminated. When the URL is closed or the process is terminated, the driver 142 may invalidate the file upload cache and determine the file classification anew. Further, the driver 142 may detect a match between the scheduled file or folder upload and a prior file classification entry, such that when a prior classification exists, the driver 142 processes the scheduled file or folder upload based upon this prior classification. For further verification that the file classification has not changed to a differing one, the driver 142 may detect whether the prior modification timestamp of the scheduled file or folder upload corresponds with the prior classification. In the alternative, when no prior classification exists, the driver 142 may determine a file classification for the scheduled file or folder upload anew, where the driver assesses whether the file corresponds with a file in a file/domain filter or violates a DLP policy. Accordingly, the file system driver 142 processes the file upload request in accordance with either a prior file classification, a file/domain filter, or a DLP policy.

It is appreciated that the components of exemplary operating environment 100 are exemplary and more or fewer components may be present in various configurations. It is appreciated that operating environment may be part of a distributed computing environment, a cloud computing environment, a client server environment, and the like. In other words, as would be apparent to one of ordinary skill in the art after reading this description, the various features and functionality described herein may be implemented in the DLP system using any arrangement components necessary to perform the DLP with enhanced file upload processing and other features (and functionality); and can be implemented in one or more separate or shared modules in various combinations and permutations.

Figure 2:
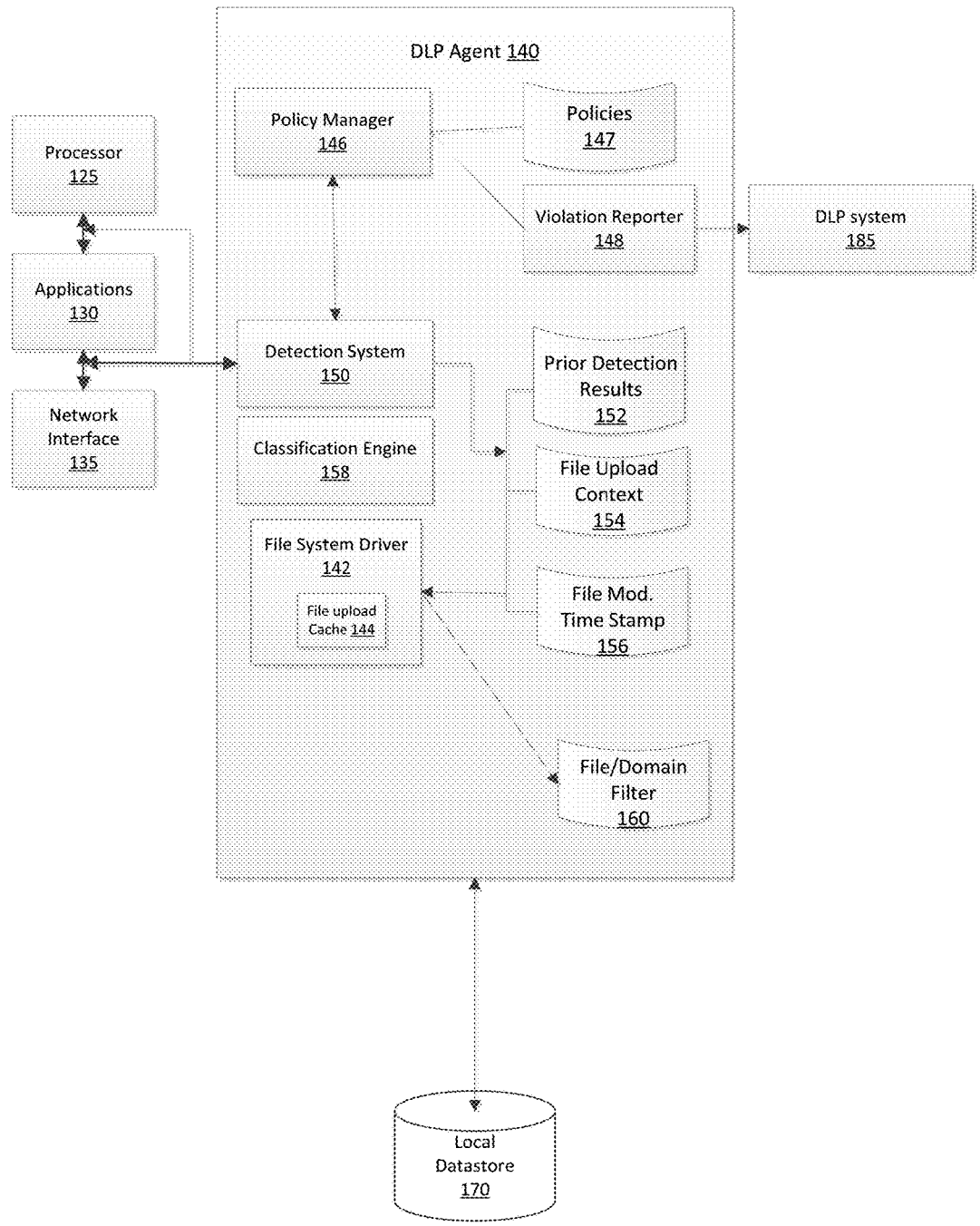
FIG. 2 is a block diagram showing the contents of one example embodiment of the DLP agent of FIG. 1 in some embodiments.

FIG. 2 is an illustration of one example embodiment of a DLP agent 140 having the filesystem driver 142 in accordance with the DLP system disclosed herein. In particular, DLP agent 140, including a classification engine 153 and a detection system 150 to detect violations of a DLP policy, may be installed on one DLP server 180 in one example embodiment. The DLP agent 140 may also include, a policy manager 146, a policy data store 147, and a violation reporter 148 for the purpose of determining whether the pending file transfer violates a DLP policy. DLP agent 140 may communicate with the DLP system 185 to retrieve the policies generated by the policy generator 187 within system 185. These policies may be stored in the policy data store 147. Although it is shown that policy manager 146 communicates with DLP system 185 indirectly through violation reporter 148, it can be appreciated that policy manager 146 can be directly coupled to a DLP system 185 to retrieve the DLP policies, which it generates. When the policy manager 146 determines that a policy has been violated, the violation reporter 148 may send the corresponding data to a DLP system 185.

Further, the DLP agent 140 may include a prior detection result data store 152, a file upload context database 154, and a timestamp data store 156 indicating file modification of any file on the client device 120. Additionally, the DLP agent 140 may include a file/domain filter data store 160 that includes file and domain filters defined by the system administrator or the user. These file and domain filters may include a definition for files that are deemed exceptions to DLP policy processing. That is, this feature enables users to white list specific files and domains for file uploads. For example, the user may specify that files located within a particular folder may be uploaded whether they comprise sensitive data or not. In addition, a system administrator may define that all files uploaded to a particular URL (domain) should be blocked. Additionally as shown, the filesystem driver 142 can include a file upload cache 144 four caching file upload context, prior detected results, timestamps, and the like.

In the depicted embodiment, the classification engine 158 and the detection system 150 may be configured to monitor pending outbound data transfers. These outbound data transfers may include data in transit, such as data associated with outgoing messages or other network traffic being sent by the client computing system 120a to a destination entity. In the alternative, outbound data transfers may include data being printed, copied to a remote storage device, such as USB drive, a remote disk, or the like. The outbound data transfers may be any data being transferred by the client computing system 120a through a wireless or wired connection to a destination entity, such as another device or to a remote device, such as, for example, a removable storage drive. The outbound data transfers may also be over the network 175 or over direct connections to the client computing system 120a.

In operation, DLP agent 140 may monitor when a file is scheduled to be uploaded through a browser application by monitoring the network interface 135, applications 130, and processor 125. In response to detecting a scheduled file upload, DLP agent 140 may initiate in real-time the capture of file upload context associated with the scheduled file or folder upload and store this context data in the file upload context database 154. As previously noted, the captured file upload context may include the file name, folder name, metadata, active URL, and the like. Further, in an effort to detect an associated operation corresponding to the scheduled file or folder upload, the DLP agent 140 may intercept the shell dialogue API, the browse folder API, or the drop process interface, to determine whether a single/multi-file upload, a folder upload, or a drag and drop operation is associated with the file scheduled to be uploaded. A detected match between the file to be uploaded and data parsed from either the shell dialogue API, the browse folder API, or the drop process interface can indicate the associated operation for the scheduled file or folder upload. Additionally, DLP agent 140 can monitor when a file has been modified and retrieve the timestamp information for storage in the timestamp data store 156. After the file upload context has been generated, DLP agent 140 may send the file upload context to the filesystem driver 142 for further processing based upon the file upload context and other parameters. In response, the filesystem driver 142 may cache the associated data of the three databases including prior detection results, file upload context, and timestamp information (152, 154, 156) to be stored in cache 144. Thereby, the filesystem driver 142 may process the pending upload based upon the file upload cache; wherein, the driver 142 may intercept and process the file open call based upon the file upload cache.

In some embodiments, the file system driver 142 initiates the processing of a file open call by detecting a match between the file path of the scheduled file or folder upload and a current process, a parent process, or a process that initiates a current XPC service. In response to a detected filepath match, file system driver 142 may detect whether the active URL is closed or the browser process is terminated. When the URL is closed or the process is terminated, the driver 142 may invalidate the file upload cache and determine the file classification anew. Further, the driver 142 may detect a match between the scheduled file or folder upload and a prior file classification entry of the prior detection results 152. Accordingly, when a prior classification exists, the file system driver 142 processes the scheduled file or folder upload based upon this prior classification. For further verification that the file classification has not changed to a differing one, the file system driver 142 may detect whether the prior modification timestamp located in file modification timestamp data store 156 is correlated to the prior classification. In the alternative, when no prior classification exists, the file system driver 142 may determine a file classification for the scheduled file or folder upload anew, where the driver assesses whether the file corresponds with a file in a file/domain filter within file/domain filter data store 160 or violates a DLP policy found within policy data store 147. Accordingly, the file system driver 142 processes the file upload request in accordance with either a prior file classification, a file/domain filter, or a DLP policy.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Figure 3A:
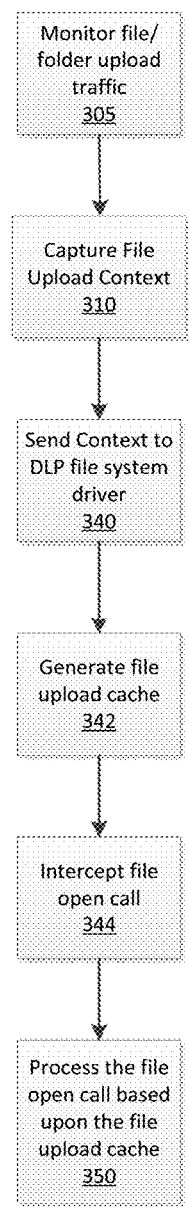
FIG. 3A is a flow diagram of a method for DLP with enhanced file upload processing in accordance with some embodiments.

FIG. 3A is an exemplary flow diagram of a method 300 for DLP with enhanced file upload processing in accordance with some embodiments. The method includes monitoring file and folder uploads using the following methods: shell dialogue, drag-and-drop operation, associated child processes, sandboxed application file uploads, and context association. Accordingly, the DLP agent 140 within client 120 may monitor file and folder upload traffic in an action 305. For example, the DLP agent 140 may monitor the network interface 135 or the applications 130 4A pending outbound data transfer. In response to a detected file or folder upload, the DLP agent 140 may capture contextual data associated with the pending file or folder upload (file upload context), in an action 310. Once the DLP agent 140 captures the file upload context, DLP agent 140 may send this file upload context data to the DLP file system driver, in an action 340. In response, the DLP filesystem driver 142 may generate a file upload cache, by caching the file upload context, prior classification entries, and a timestamp indicating when the scheduled file or folder upload was last modified in an action 342. Consequently, the DLP filesystem driver 142 may intercept the file open call in an action 344; and process the file open call based upon the file upload cache (in an action 350).

Figure 3B:
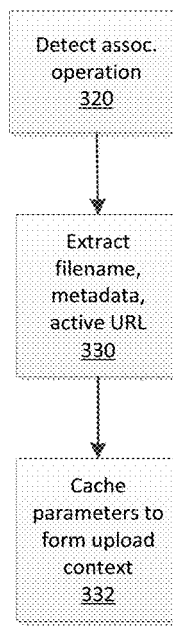
FIG. 3B is a flow diagram of a method for capturing file upload context of FIG. 3A, in accordance with some embodiments.
Figure 3C:
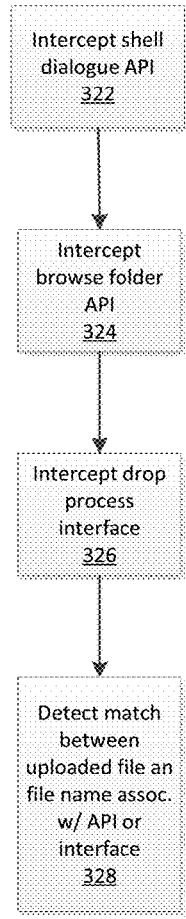
FIG. 3C is a flow diagram of a method for detecting an associated operation for the scheduled file or folder upload of FIG. 3B, in accordance with some embodiments.

In some embodiments, as shown in FIG. 3B, which represents a flow diagram for a method for capturing file upload context of FIG. 3A, DLP agent 140 may detect an associated operation for the potential file transfer. In one embodiment, in an action 320, the DLP agent 140 may determine whether the scheduled file or folder upload corresponds to a single file upload, multi-file upload, folder upload or a drag-and-drop operation. More particularly, as shown in FIG. 3C, which is a representation of a method for detecting an associated operation for the scheduled file or folder upload of FIG. 3B, agent 140 may intercept a shell dialogue API to detect a single file upload or a multi file upload in an action 322. Agent 140 may also intercept a browse folder API to detect a folder upload in an action 324. Further, in an action 326, agent 140 may intercept a drop process interface exposed by the browser during an instance creation to detect the drag-and-drop operation. Once the agent 140 has intercepted these APIs, agent 140 may detect a match between the pending file to be uploaded and a parameter associated with either the shell dialogue API, the browse folder API, or the drop process interface in an action 328. Referring back to FIG. 3B, once the agent 140 determines the associated operation, in an action 330, agent 140 extracts data associated with the pending scheduled file or folder upload, such as the file name, metadata, and active URL, and the like. In an action 332, agent 140 may package the extracted data into one format to form the file upload context.

Figure 3D:
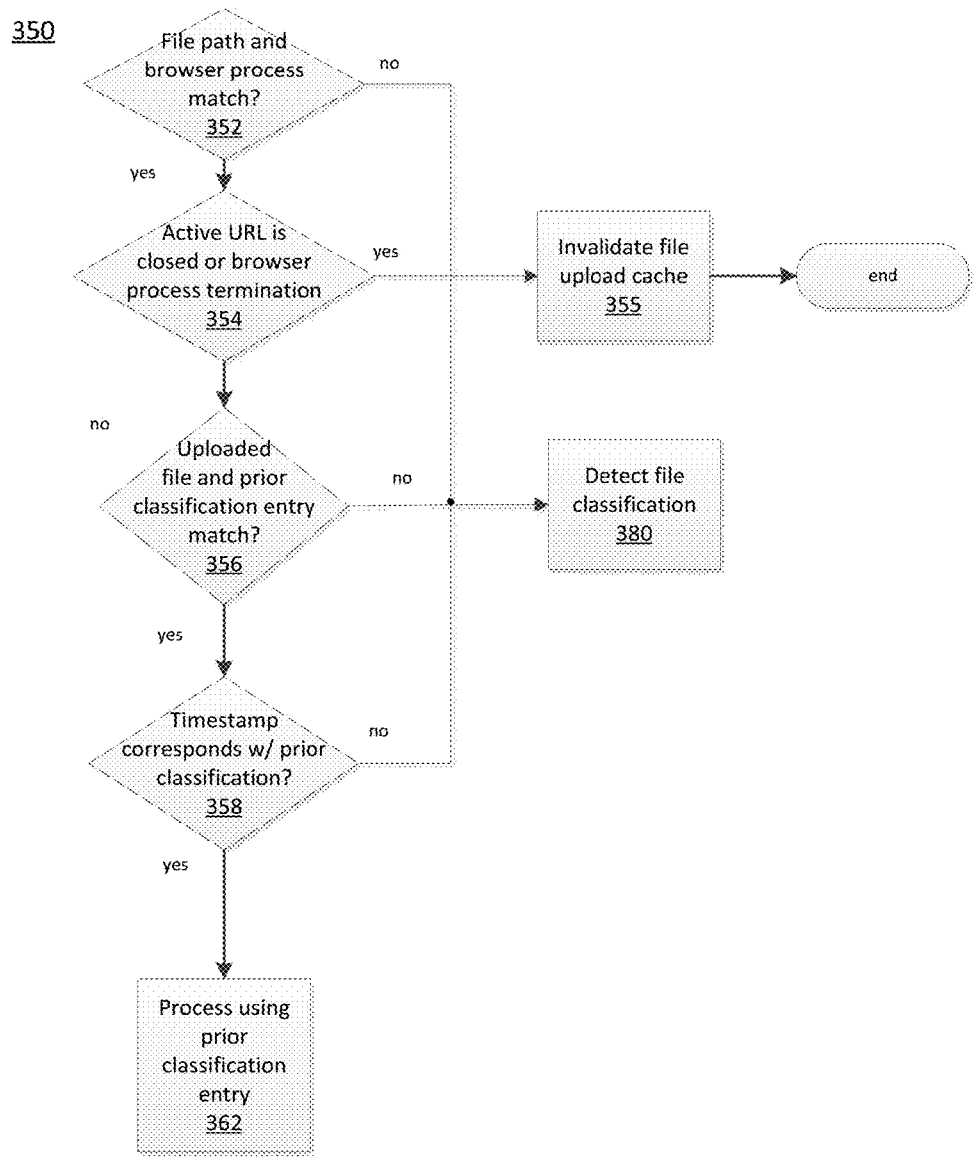
FIG. 3D is a flow diagram of a method for processing the file open call based upon the file upload cache of FIG. 3A, in accordance with some embodiments.

In some embodiments, as shown in FIG. 3D, which represents a flow diagram of a method for processing the file open call based upon the file upload cache (350) of FIG. 3A, the filesystem driver 142 may first detect a match between a file-path of the scheduled file or folder upload and a current process, a parent process, or a process that initiates a current XPC service in a decision action 352. If it is determined that the file-path matches the process, the filesystem driver 142 may detect whether the active URL is closed whether browser process is terminated in a decision action 354. When the URL is closed or the browser process is terminated, the driver 142 may invalidate the file upload cache in an action 355, which will and the process. In the alternative, when the URL is still active (open) and the browser process is live, the filesystem driver 142 may detect whether the pending file to be uploaded match is a prior classification entry in a decision action 356. When a prior classification is detected, the filesystem driver 142 may determine whether the timestamp indicating the last modification of the pending upload corresponds with the prior classification in an action 358. For example, at times the file may be modified to either add sensitive data or remove sensitive data; and thereby, the file's classification may change. Accordingly, the decision action 358 accounts for events where the file classification has changed. If the timestamp corresponds to the prior classification, the filesystem driver 142 can process the file in accordance with the prior classification entry found (in an action 362). When the timestamp does not correspond to the prior classification, the filesystem driver 142 may detect the file's classification anew, in action 380. Similarly when the scheduled file or folder upload does not match the prior classification entry (action 356) or the file path and the browser process do not match (action 352), the filesystem driver 142 may detect the file's classification anew, in action 380.

Figure 3E:
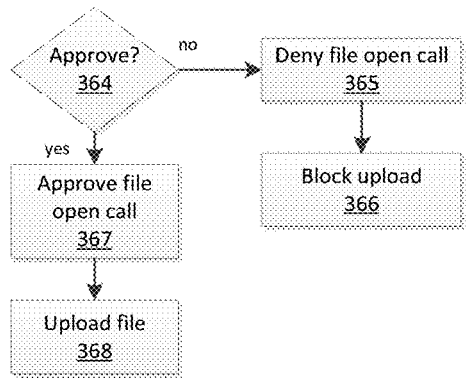
FIG. 3E is a flow diagram of a method for processing the file upload based upon a matched prior classification entry of FIG. 3D, in accordance with some embodiments.

When the prior classification entry is used to process the file open call, as shown in FIG. 3E, the filesystem driver 142 merely detects whether the file was approved to or denied. FIG. 3E is a flow diagram of the method for processing the file upload based upon a matched prior classification entry of FIG. 3D, in accordance with some embodiments. In particular, in a decision action 364, the filesystem driver 142 detects whether the prior file classification is approved. When the prior classification is approved, driver 142 may approve the file open call in an action 367 and upload the file in an action 368. When the prior classification is denied, however, driver 142 may deny the file open call in an action 365 and block the upload in an action 366.

Figure 3F:
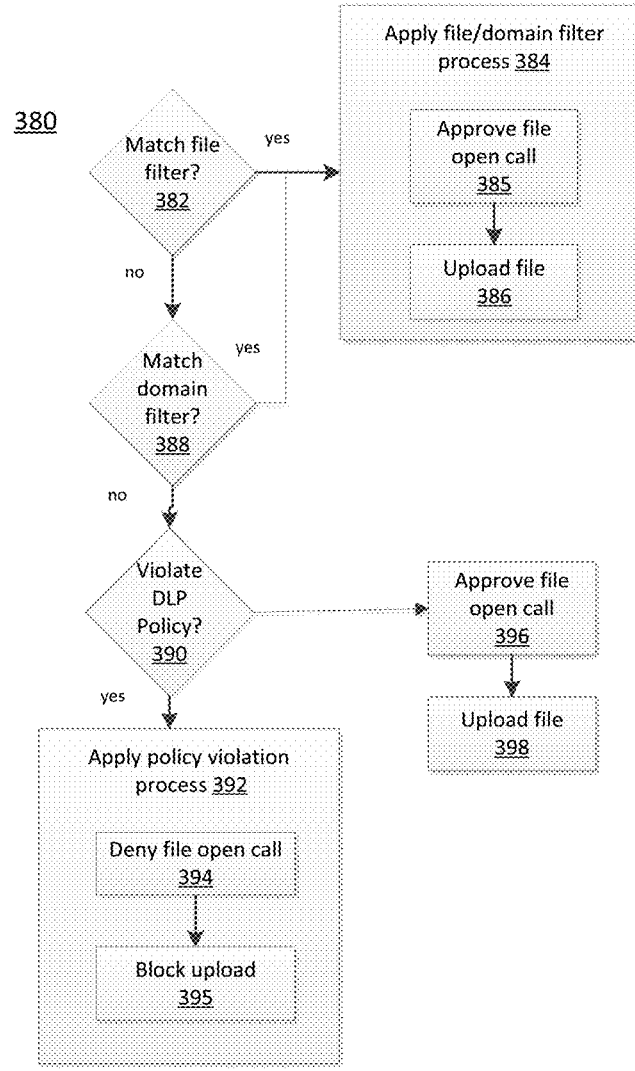
FIG. 3F is a flow diagram of a method for detecting the file classification based upon file/domain filter and DLP policies of FIG. 3D, in accordance with some embodiments.

When there is no prior classification entry present, the filesystem driver 142 may detect the file classification anew in an action 380 as shown in FIGS. 3D and 3F. In particular, FIG. 3F is a flow diagram of a method for detecting the file classification based upon file/domain filter and DLP policies of FIG. 3D, in accordance with some embodiments. More particularly, in an action 382, the filesystem driver 142 may detect whether match exists between the file to be uploaded and a file filter, such as a white list. When the file finds a match in the file filter, the filesystem driver 142 may apply the file filter process in an action 384, which would be to approve the file open call (in an action 385) and upload the file (in an action 386). The filesystem driver 142 may also detect a match between the active URL and a domain filter in a decision action 388. Similarly, when the filesystem driver 142 detects a match between the URL and a domain filter, the file/domain filter process may be applied as shown in action 384. When the file does not match the file filter or the domain filter (in actions 382 or 388), the file system driver 142 can detect whether the file violates a DLP policy in a decision action 390 when the file possesses sensitive data. If the file does not violate any DLP policy, the file open call may be approved in an action 396 and the file may be uploaded in an action 398. When the file violates a DLP policy, however, the driver 142 may apply a policy violation process in an action 392, which includes denying the file open call (in an action 394) and blocking the upload (in an action 395). Although not shown, when the file is classified as non-sensitive or contains sensitive data but is allowed, the related entry within the file upload cache may be removed and the file system open call may be allowed.

Figure 4:
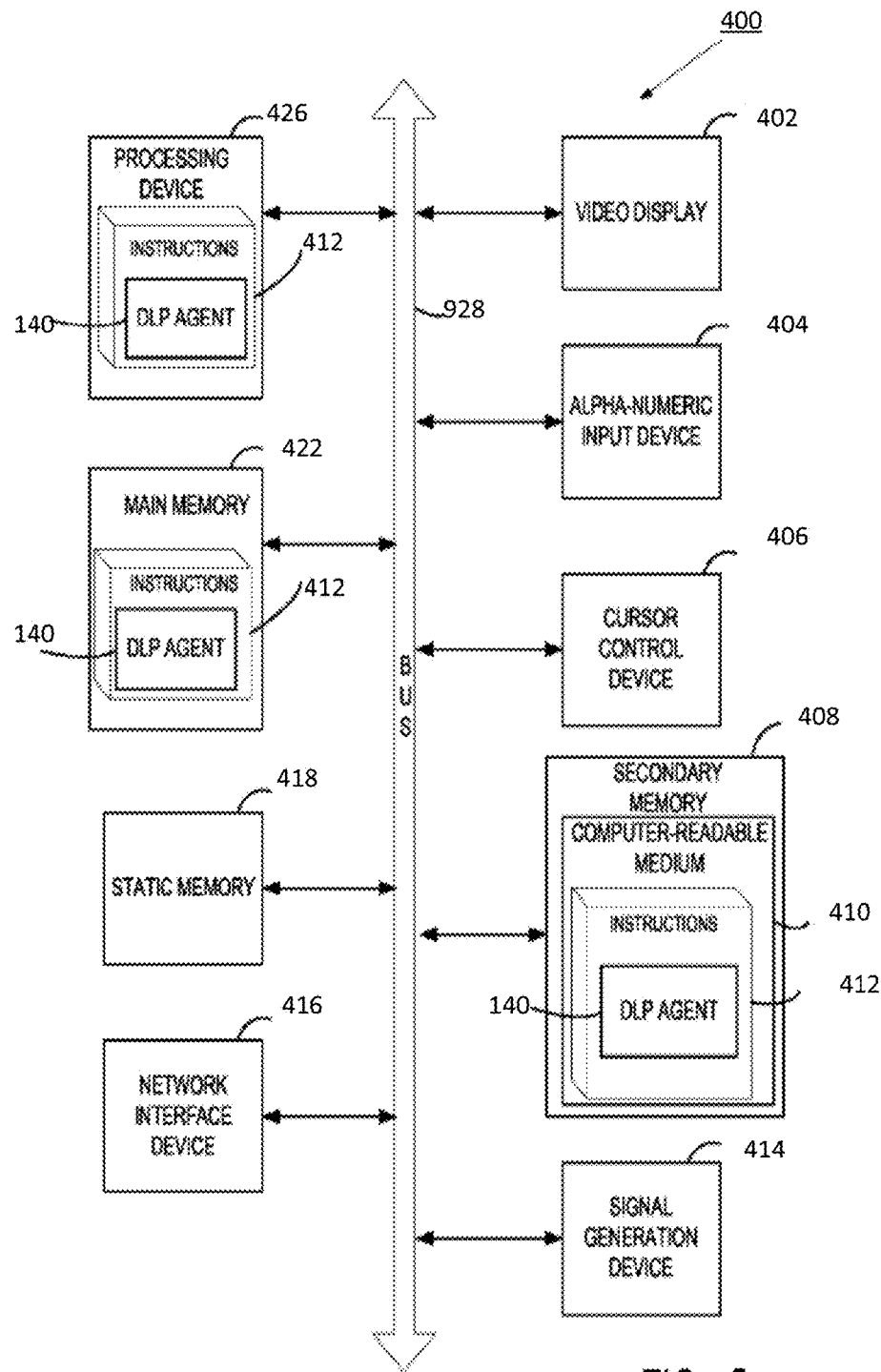
FIG. 4 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 4 is an illustration showing an exemplary computing device which may implement the embodiments described herein. The computing device of FIG. 4 may be used to perform embodiments of the functionality for performing the enhanced file upload data loss protection in accordance with some embodiments. In particular, FIG. 4 is a diagram of one embodiment of a computer system for facilitating the execution of the DLP manager. Within the computer system 400 is a set of instructions for causing the machine to perform any one or more of the methodologies discussed herein. CPU 400 can be defined to execute the functionality described herein to enable the functionality described with reference to FIGS. 1-3F. In alternative embodiments, the machine may be connected (e.g., networked) to other machines in a LAN, an intranet, an extranet, or the Internet. The machine can be a host in a cloud, a cloud provider system, a cloud controller or any other machine. The machine can operate in the capacity of a server or a client machine in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processing device 426, a main memory 422 (e.g., read-only memory (ROM), flash memory, dynamic random access memory (DRAM) such as synchronous DRAM (SDRAM) or DRAM (RDRAM), etc.), a static memory 418 (e.g., flash memory, static random access memory (SRAM), etc.), and a secondary memory 408 (e.g., a data storage device in the form of a drive unit, which may include fixed or removable computer-readable storage medium), which communicate with each other through a bus 428. The code embodying the functionality of the method disclosed herein may be stored within main memory 422, static memory 418, or secondary memory 408 for execution by a processor such as processing device 426 in some embodiments. The operating system on the computing device may be MS-WINDOWS®, UNIX®, LINUX®, iOS®, CentOS®, Android®, Redhat Linux®, z/OS®, or other known operating systems. It should be appreciated that the embodiments described herein may be integrated with virtualized computing system also.

Processing device 426 represents one or more general-purpose processing devices such as a microprocessor, central processing unit, or the like. More particularly, the processing device 426 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 426 may also be one or more special-purpose processing devices such as an application specific integrated circuit (ASIC), a field programmable gate array (FPGA), a digital signal processor (DSP), network processor, or the like. Processing device 426 is configured to execute the instructions 724 for performing the operations and steps discussed herein.

The computer system 400 may further include a network interface device 416. The computer system 400 also may include a video display unit 402 (e.g., a liquid crystal display (LCD) or a cathode ray tube (CRT)) connected to the computer system through a graphics port and graphics chipset, an alphanumeric input device 404 (e.g., a keyboard), a cursor control device 406 (e.g., a mouse), and a signal generation device 414 (e.g., a speaker).

The secondary memory 408 may include a machine-readable storage medium (or more specifically a computer-readable storage medium) 410 on which is stored one or more sets of instructions 412 embodying any one or more of the methodologies or functions described herein. In one embodiment, the instructions 412 include instructions for the DLP manager 140. The instructions 412 may also reside, completely or at least partially, within the main memory 422 and/or within the processing device 426 during execution thereof by the computer system 400, the main memory 422 and the processing device 426 also constituting machine-readable storage media.

The computer-readable storage medium 410 may also be used to store the instructions 712 persistently. While the computer-readable storage medium 410 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The instructions 412, components and other features described herein can be implemented as discrete hardware components or integrated in the functionality of hardware components such as ASICS, FPGAs, DSPs or similar devices. In addition, the instructions 412 can be implemented as firmware or functional circuitry within hardware devices. Further, the instructions 412 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items. As used herein, the singular forms "a", "an" and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved. With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, flash memory devices, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to so connote structure by indicating that the units/circuits/ components include structure (e.g., circuitry) that performs the task or tasks during operation. As such, the unit/circuit/ component can be said to be configured to perform the task even when the specified unit/circuit/component is not currently operational (e.g., is not on). The units/circuits/components used with the "configured to" language include hardware; for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/ component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of Data Loss Prevention (DLP) Protection comprising:
   capturing file upload context for a scheduled file or folder upload, wherein capturing the file upload context comprises:
      detecting an associated operation for the scheduled file or folder upload, including whether the scheduled file or folder upload corresponds to a single file upload, multi-file upload, folder upload, or a drag-and-drop operation, and wherein detecting the associated operation comprises:
         intercepting a shell dialogue Application Programming Interface (API) to detect the single file upload and multi-file upload;
         intercepting a browse folder API to detect the folder upload;
         intercepting a drop process interface exposed by browser during an instance creation to detect the drag-and-drop operation;
         detecting a match between the scheduled file or folder upload and data associated with the shell dialogue API, the browse folder API, and the drop process interface;
      extracting metadata, and active Uniform Resource Locator (URL) associated with the scheduled file or folder upload; and
      caching folder name, metadata, and active URL to form the file upload context wherein the folder name is cached in a global structure;
   sending the file upload context to a DLP filesystem driver;
   generating a file upload cache including the file upload context, prior classification entries, and a timestamp indicating when the scheduled file or folder upload was last modified;
   intercepting a file open call by the DLP filesystem driver; and
   processing the file open call based upon the file upload cache.

2. The method of claim 1, wherein the processing of the file open call comprises:
   detecting a match between a file path of the scheduled file or folder upload and a current process, a parent process, or a process that initiates a current Mac Operating System (OS) X interProcess Communication (XPC) service;
   detecting, in response to the detected file path match, whether the active URL is closed or browser process is terminated;
   invalidating, in response to closed URL or terminated process, the file upload cache;
   detecting, in response to open URL or active browser process, a match between the scheduled file or folder upload and a prior classification entry;
   determining, in response to the detected prior classification entry, whether the last modified timestamp corresponds with the detected prior classification entry;
   applying, in response to the corresponding timestamp, a processing associated with the prior classification entry; and
   detecting, in response to no detected prior classification match, a file classification for the scheduled file or folder upload.

3. The method of claim 2, wherein the applying of the processing comprises:
   approving, when the prior classification entry is approved, the file open call and uploading the file; and
   denying, when the prior classification entry is denied, the file open call and blocking file upload.

4. The method of claim 2, wherein the detecting of the file classification comprises:
   detecting a match between the scheduled file or folder upload and a file filter;
   detecting a match between the active URL and a domain filter;
   applying, in response to the detected file filter match or the detected domain filter match, a processing scheme based upon the file filter or domain filter;
   determining, in response to no detected match, whether the scheduled file or folder upload violates a security policy, wherein the scheduled file or folder upload contains sensitive data according to one or more DLP policies;
   applying, in response to the detected security policy violation, a policy violation processing scheme; and
   approving, in response to no detected security policy violation, the file open call and uploading the file.

5. The method of claim 4, wherein the applying of the processing scheme based upon the file filter or the domain filter comprises:
   approving the file open call; and
   uploading the file.

6. The method of claim 4, wherein the applying of the processing scheme based upon the policy violation processing scheme comprises:
   denying the file open call; and
   blocking file upload.

7. The method of claim 1, wherein the metadata includes a process identifier (PID) or active user information.

8. The method of claim 1, wherein the intercepting of the shell dialogue API comprises:
executing a GetOpenFileName or NSOpenPanel command.

9. The method of claim 1, wherein the intercepting of the browse folder API comprises:
executing a ShBrowseForFolder command.

10. The method of claim 1, wherein the intercepting of the drop process comprises:
executing a IDropTargetHelper command.

11. A DLP system comprising:
a memory; and
a processor coupled to the memory to execute a DLP agent, the processor configured to:
capture file upload context for a scheduled file or folder upload, wherein the processor, for capturing the file upload context, is configured to:
detect an associated operation for the scheduled file or folder upload, including whether the scheduled file or folder upload corresponds to a single file upload, multi-file upload, folder upload, or a drag-and-drop operation, and wherein detecting the associated operation comprises:
intercept a shell dialogue Application Programming Interface (API) to detect the single file upload and multi-file upload;
intercept a browse folder API to detect the folder upload;
intercept a drop process interface exposed by browser during an instance creation to detect the drag-and-drop operation;
detect a match between the scheduled file or folder upload and data associated with the shell dialogue API, the browse folder API, and the drop process interface;
extract metadata, and active Uniform Resource Locator (URL) associated with the scheduled file or folder upload; and
cache folder name, metadata, and active URL to form the file upload context wherein the folder name is cached in a global structure;
send the file upload context to a DLP filesystem driver;
generate a file upload cache including the file upload context, prior classification entries, and a timestamp indicating when the scheduled file or folder upload was last modified;
intercept a file open call by the DLP filesystem driver; and
process the file open call based upon the file upload cache.

12. The DLP system of claim 11, wherein the processor, for processing the file open call, is configured to:
detect a match between a file path of the scheduled file or folder upload and a current process, a parent process, or a process that initiates a current Mac Operating System (OS) X interProcess Communication (XPC) service;
detect, in response to the detected file path match, whether the active URL is closed or browser process is terminated;
invalidate, in response to closed URL or terminated process, the file upload cache;
detect, in response to open URL or active browser process, a match between the scheduled file or folder upload and a prior classification entry;
determine, in response to the detected prior classification entry, whether the last modified timestamp corresponds with the detected prior classification entry;
apply, in response to the corresponding timestamp, a processing associated with the prior classification entry; and
detect, in response to no detected prior classification match, a file classification for the scheduled file or folder upload.

13. The DLP system of claim 12, wherein the processor, for detecting the file classification, is configured to:
detect a match between the scheduled file or folder upload and a file filter;
detect a match between the active URL and a domain filter;
apply, in response to the detected file filter match or the detected domain filter match, a processing scheme based upon the file filter or domain filter;
determine, in response to no detected match, whether the scheduled file or folder upload violates a security policy, wherein the scheduled file or folder upload contains sensitive data according to one or more DLP policies;
apply, in response to the detected security policy violation, a policy violation processing scheme; and
approve, in response to no detected security policy violation, the file open call and uploading the file.

14. A non-transitory computer-readable medium including code for performing a method, the method comprising:
capturing file upload context for a scheduled file or folder upload, wherein
capturing the file upload context comprises:
detecting an associated operation for the scheduled file or folder upload, including whether the scheduled file or folder upload corresponds to a single file upload, multi-file upload, folder upload, or a drag-and-drop operation, and wherein detecting the associated operation comprises:
intercepting a shell dialogue Application Programming Interface (API) to detect the single file upload and multi-file upload;
intercepting a browse folder API to detect the folder upload;
intercepting a drop process interface exposed by browser during an instance creation to detect the drag-and-drop operation;
detecting a match between the scheduled file or folder upload and data associated with the shell dialogue API, the browse folder API, and the drop process interface;
extracting metadata, and active Uniform Resource Locator (URL) associated with the scheduled file or folder upload; and
caching folder name, metadata, and active URL to form the file upload context wherein the folder name is cached in a global structure;
sending the file upload context to a DLP filesystem driver;
generating a file upload cache including the file upload context, prior classification entries, and a timestamp indicating when the scheduled file or folder upload was last modified;
intercepting a file open call by the DLP filesystem driver; and
processing the file open call based upon the file upload cache.

15. The computer-readable medium of claim 14, wherein the processing of the file open call comprises:

detecting a match between a file path of the scheduled file or folder upload and a current process, a parent process, or a process that initiates a current XPC service;

detecting, in response to the detected file path match, whether the active URL is closed or browser process is terminated;

invalidating, in response to closed URL or terminated process, the file upload cache;

detecting, in response to open URL or active browser process, a match between the scheduled file or folder upload and a prior classification entry;

determining, in response to the detected prior classification entry, whether the last modified timestamp corresponds with the detected prior classification entry;

applying, in response to the corresponding timestamp, a processing associated with the prior classification entry; and detecting, in response to no detected prior classification match, a file classification for the scheduled file or folder upload.

16. The computer-readable medium of claim 15, wherein the detecting of the file classification comprises:

detecting a match between the scheduled file or folder upload and a file filter;

detecting a match between the active URL and a domain filter;

applying, in response to the detected file filter match or the detected domain filter match, a processing scheme based upon the file filter or domain filter;

determining, in response to no detected match, whether the scheduled file or folder upload violates a security policy, wherein the scheduled file or folder upload contains sensitive data according to one or more DLP policies; and applying, in response to the detected security policy violation, a policy violation processing scheme.

* * * * *